(No Model.)

S. MOORE.
HEEL STIFFENER FOR BOOTS OR SHOES AND METHOD OF MANUFACTURING THE SAME.

No. 367,430. Patented Aug. 2, 1887.

Witnesses
Homer Rogers
F. E. Hort

Inventor
Stephen Moore

UNITED STATES PATENT OFFICE.

STEPHEN MOORE, OF NEWTON, MASSACHUSETTS, ASSIGNOR TO THE MOUSAM MANUFACTURING COMPANY OF MAINE.

HEEL-STIFFENER FOR BOOTS OR SHOES AND METHOD OF MANUFACTURING THE SAME.

SPECIFICATION forming part of Letters Patent No. 367,430, dated August 2, 1887.

Application filed May 15, 1886. Serial No. 202,285. (No model.)

*To all whom it may concern:*

Be it known that I, STEPHEN MOORE, of Newton, in the county of Middlesex and State of Massachusetts, have invented a new and useful Improvement in Heel-Stiffeners for Boots or Shoes and in the Method of their Manufacture, of which the following, taken in connection with the accompanying drawings, is a specification.

My invention relates to that class of heel-stiffeners for boots or shoes which is composed of two or more layers of leather or similar flexible material.

The cost of solid leather prevents its use for this purpose except to a limited extent, and factitious leather, known as "leather-board," is, if of a durable quality, objectionable on account of its extreme stiffness; hence the two have been combined in various ways by cementing or pasting together one or more layers of each to the other to obtain the requisite degree of flexibility, strength, and cheapness. Stiffeners thus made, when put to use in the shoe and exposed to moisture, are liable to a separation of the layers of which they are composed, especially at the upper edge of the stiffener.

The object of my invention is to so unite two or more layers of material in a stiffener that no joint between such layers shall be exposed along its upper edge, where, as usually made, they are most liable to separate; and my invention consists of a stiffener made of two or more layers of material, the surface layers of which are each parts of one and the same piece of leather, being united at the top of the stiffening, but split from the bottom toward the top, so as to allow the insertion of one or more additional layers of material, which are contained between the said surface layers; also, of a new method of manufacturing stiffeners, the same consisting in first cutting a piece of leather to substantially the desired shape to form a stiffener, then splitting the same from the bottom to a line near the top, then placing between the layers thus formed an additional piece of material, and fastening the whole together to form the stiffener, and, further, of a stiffener made of leather which has been split, as above described, and a piece of parchmentized paper-board or "leatheroid" inserted between such layers, as set forth.

Figure 1:
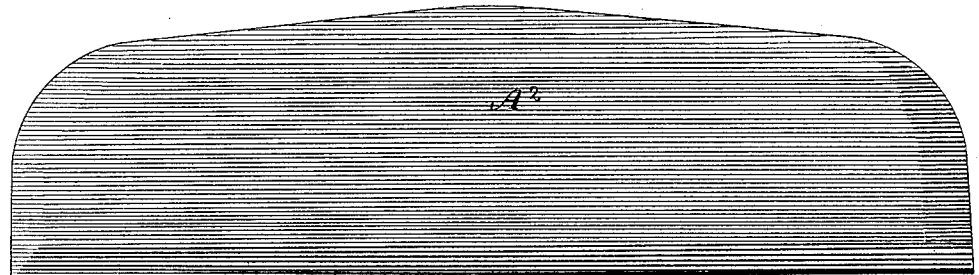
Figure 2:
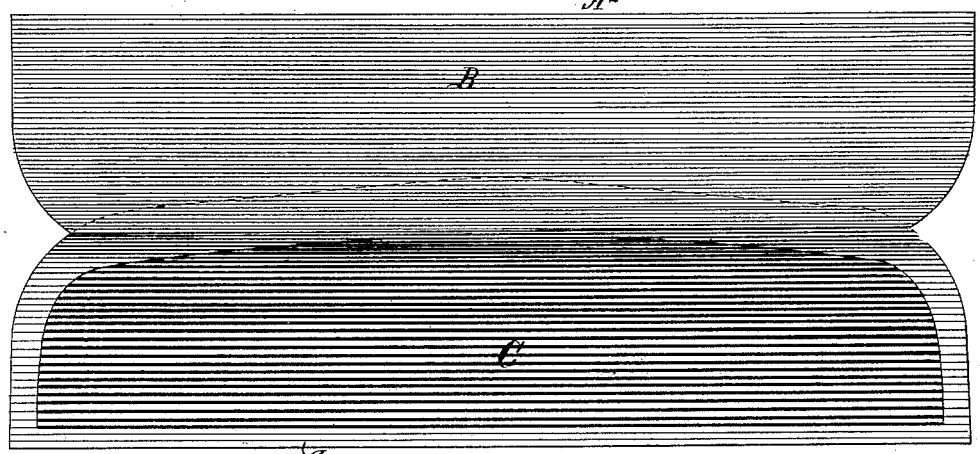
Figure 3:
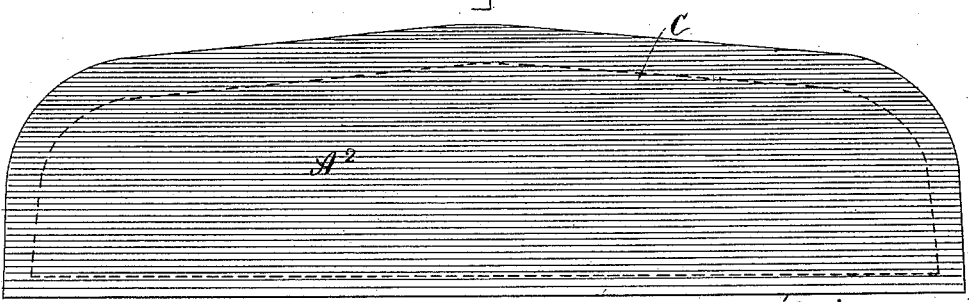
Figure 4:
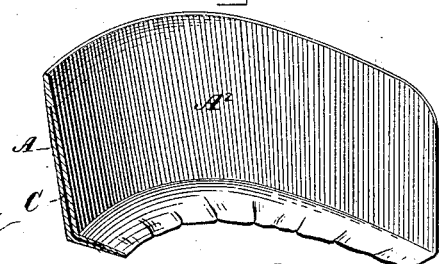

In the drawings, Figure 1 represents a leather stiffener cut to the usual shape; Fig. 2, the same split from the bottom or straight edge to a line near the top or opposite edge, with one of the layers so made by splitting turned back and another piece of material laid upon the cut surface thus exposed. Fig. 3 shows a finished stiffener; Fig. 4, the same in cross-section after having been molded to its final shape.

In carrying out my invention I take leather that is not of sufficient thickness and stiffness to make a good stiffener by itself, and having cut the same to the proper shape, (usually approximating that shown in Fig. 1,) I split it into two layers from the bottom to a line near the top, as shown in Fig. 2, turning up a layer or flap, B. On the cut surface thus exposed I put another piece of suitable material, C, preferably leatheroid, a material made of parchmentized paper, which, on account of its stiffness and elasticity, is peculiarly adapted to such use. This central layer I then paste or cement on both sides, and when the flap B is turned back to place and the whole subjected to pressure the result is the stiffener shown in Fig. 3, and when molded to shape is shown in section in Fig. 4, A and A² representing the outer and inner layers, respectively; C, the central layer.

The stiffener may be stitched or riveted, if desired; but I prefer to simply cement the parts, as described. The central piece, C, being entirely inclosed along its top edge by the surface layers, which there unite in one, there can be no separation at that point, as is liable to take place in stiffeners made of layers in the usual way.

I claim—

1. As an improved manufacture, a heel-stiffener for a boot or shoe, composed of two or more layers of material, the surface layers of which are one and the same piece, being united at the top of the stiffener, but split from the bottom upward, in combination with one or more additional layers inserted between said surface layers where they have been so split apart, and the several layers being united by cement or paste, substantially as specified.

2. A heel-stiffener consisting of a single piece of leather split from the bottom to near the top, where the split portions are united by an uncut hinge or fin, and having inserted between the split leaves a piece of leatheroid, the several parts being cemented or otherwise united together, substantially as set forth.

3. The process of manufacturing heel-stiffeners for boots or shoes herein set forth, consisting in first cutting a piece of leather to substantially the shape required, then splitting the same from the bottom to a line near the top and placing between the layers thus formed an additional layer of material, and then fastening the whole together to form the stiffener, substantially as herein described.

In testimony whereof I have signed my name to this specification, in the presence of two subscribing witnesses, on this 14th day of May, A. D. 1886.

STEPHEN MOORE.

Witnesses:
H. STORER BARRY,
HOMER ROGERS.